US008868726B1

(12) United States Patent
Tu et al.

(10) Patent No.: US 8,868,726 B1
(45) Date of Patent: Oct. 21, 2014

(54) SYSTEMS AND METHODS FOR PERFORMING BACKUPS

(75) Inventors: Sean Tu, Eagan, MN (US); Clay Haapala, Minnetonka, MN (US); Jim Harris, Woodbury, MN (US); Girish Jorapurkar, Woodbury, MN (US); Wendy Shavor, Shoreview, MN (US)

(73) Assignee: Symantec Corporation, Mountain View, CA (US)

( * ) Notice: Subject to any disclaimer, the term of this patent is extended or adjusted under 35 U.S.C. 154(b) by 460 days.

(21) Appl. No.: 12/830,279

(22) Filed: Jul. 2, 2010

(51) Int. Cl.
  *G06F 15/173* (2006.01)
  *H04L 29/08* (2006.01)
(52) U.S. Cl.
  CPC .......... *H04L 67/32* (2013.01); *H04L 29/08945* (2013.01)
  USPC ........................................... 709/224; 709/223
(58) Field of Classification Search
  CPC ........................ H04L 67/32; H04L 29/08945
  USPC ................................................. 709/224, 223
  See application file for complete search history.

(56) References Cited

U.S. PATENT DOCUMENTS

| 2004/0039820 A1* | 2/2004 | Colby et al. | 709/226 |
| 2008/0086609 A1* | 4/2008 | Lesser et al. | 711/162 |
| 2011/0161297 A1* | 6/2011 | Parab | 707/646 |

* cited by examiner

*Primary Examiner* — Dustin Nguyen
*Assistant Examiner* — Joel Mesa
(74) *Attorney, Agent, or Firm* — ALG Intellectual Property, LLC

(57) ABSTRACT

A computer-implemented method for performing backups may include identifying a request to back up a client system. The computer-implemented method may also include identifying a plurality of backup servers available to the client system via a network. The computer-implemented method may further include pairing the client system with a backup server in the plurality of backup servers based on a measure of network proximity between the client system and the backup server. The computer-implemented method may additionally include performing the requested backup of the client system via the backup server as a result of the pairing. Various other methods, systems, and computer-readable media are also disclosed.

18 Claims, 6 Drawing Sheets

SYSTEMS AND METHODS FOR PERFORMING BACKUPS

BACKGROUND

In the digital age, organizations may manage increasingly large volumes of data. Some organizations may deploy extensive network infrastructures for storing, organizing, and accessing their data. In order to protect important data or comply with regulations, organizations may perform backups using multiple backup servers accessible via their networks.

These backups may consume various resources, including storage space, network bandwidth, and processing power. The backups may utilize these resources according to varying schedules, and some of the backups may also have certain requirements (e.g., regarding performance, security, etc.). Unfortunately, if an administrator or other user does not carefully choose the best available backup server for each backup policy during the configuration of the various backups which may be performed, some backups may unnecessarily consume resources, interfere with primary computing functions, and/or result in conflicts with other backups. Furthermore, the administrator may need a close familiarity with the network topology in order to make sensible configuration decisions. Accordingly, the instant disclosure identifies a need for systems and methods for efficiently performing backups in the context of multiple backup servers.

SUMMARY

As will be described in greater detail below, the instant disclosure generally relates to systems and methods for performing backups. Systems and methods described herein may automatically pair clients with backup servers based on a measure of network proximity of the various backup servers to each client on a network. These systems and methods may use a variety of types of information to calculate the network proximity (e.g., measures of distance between a client and a backup server such as latency, the number of intervening devices on the network, network addresses, etc.). These systems and methods may also, as a part of or in addition to considerations of network proximity, leverage information about immediate and scheduled backup needs and capacities to select a backup server to pair with a client. For example, a method may include identifying a request to back up a client system, identifying a plurality of backup servers available to the client system via a network, pairing the client system with a backup server in the plurality of backup servers based on a measure of proximity between the client and the backup server, and then performing the requested backup of the client system via the backup server as a result of the pairing.

In order to aid the pairing, systems described herein may create a logical map of the network. These systems may then determine that the backup server has a higher measure of proximity to the client system than one or more alternative backup servers.

The measure of network proximity may include a variety of information, such as one or more of the following: the network cable distance between the client system and the backup server, how many network hops are between the client system and the backup server, how many network switches are between the client system and the backup server, how many network bridges are between the client system and the backup server, how long it takes for a network packet to travel between the client system and the backup server, and/or differences in the respective network addresses of the client system and the backup server.

Systems described herein may use a variety of additional information to enhance measurements and/or use of network proximity. For example, these systems may pair the client system to the backup server based on traits of the network, such as the network bandwidth available between the client system and the backup server, the potential throughput from the client system to the backup server, the network performance between the client system and the backup server, and/or any other network traits that may affect communication between the client system and the backup server.

In some examples, systems described herein may coordinate the use of resources by pairing the client system with the backup system based on an immediate backup need of the client system, one or more scheduled backup needs of the client system, an immediate backup capacity of the backup server, and/or one or more projected backup capacities of the backup server.

Systems described herein may use a variety of additional criteria during the pairing. For example, these systems may first determine that the measure of network proximity meets a predetermined threshold before pairing the client system to the backup server. In some examples, these systems may pair the client system with the backup server to load-balance portions of the network and/or the plurality of backup servers. In some additional examples, these systems may pair the client system to the backup server after a fail-over from an alternative backup server and/or after determining that an alternative backup server is busy. In order to improve the chances of an optimal pairing, after determining that the backup server is unavailable for backup services, these systems may wait until the backup server is available in order to pair the backup server with the client system.

The pairing may take place in a variety of contexts. For example, systems described herein may request backup resources from a media manager. The media manager may then transmit the pairing in response to the request.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
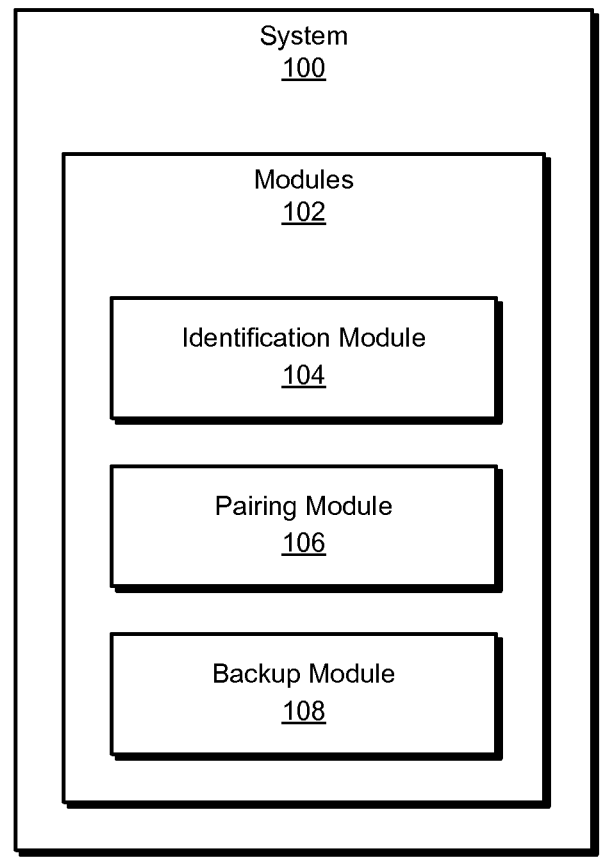
FIG. 1 is a block diagram of an exemplary system for performing backups.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for performing backups. Systems and methods described herein may automatically pair clients with backup servers based on a measure of network proximity of the various backup servers to each client on a network. These systems and methods may use a variety of types of information to calculate the network proximity (e.g., measures of distance between a client and a backup server such as latency, the number of intervening devices on the network, network addresses, etc.). These systems and methods may also, as a part of or in addition to considerations of network proximity, leverage information about immediate and scheduled backup needs and capacities to select a backup server to pair with a client.

By analyzing backup needs and resources in the context of network topology, these systems and methods may efficiently use and/or allocate resources (e.g., network bandwidth, server capacity, etc.), minimize interference with primary applications, and/or increase backup performance and reliability. By automatically pairing clients with backup servers, these systems and methods may also save time for administrators who may otherwise have manually configured target backup servers for each client.

Figure 2:
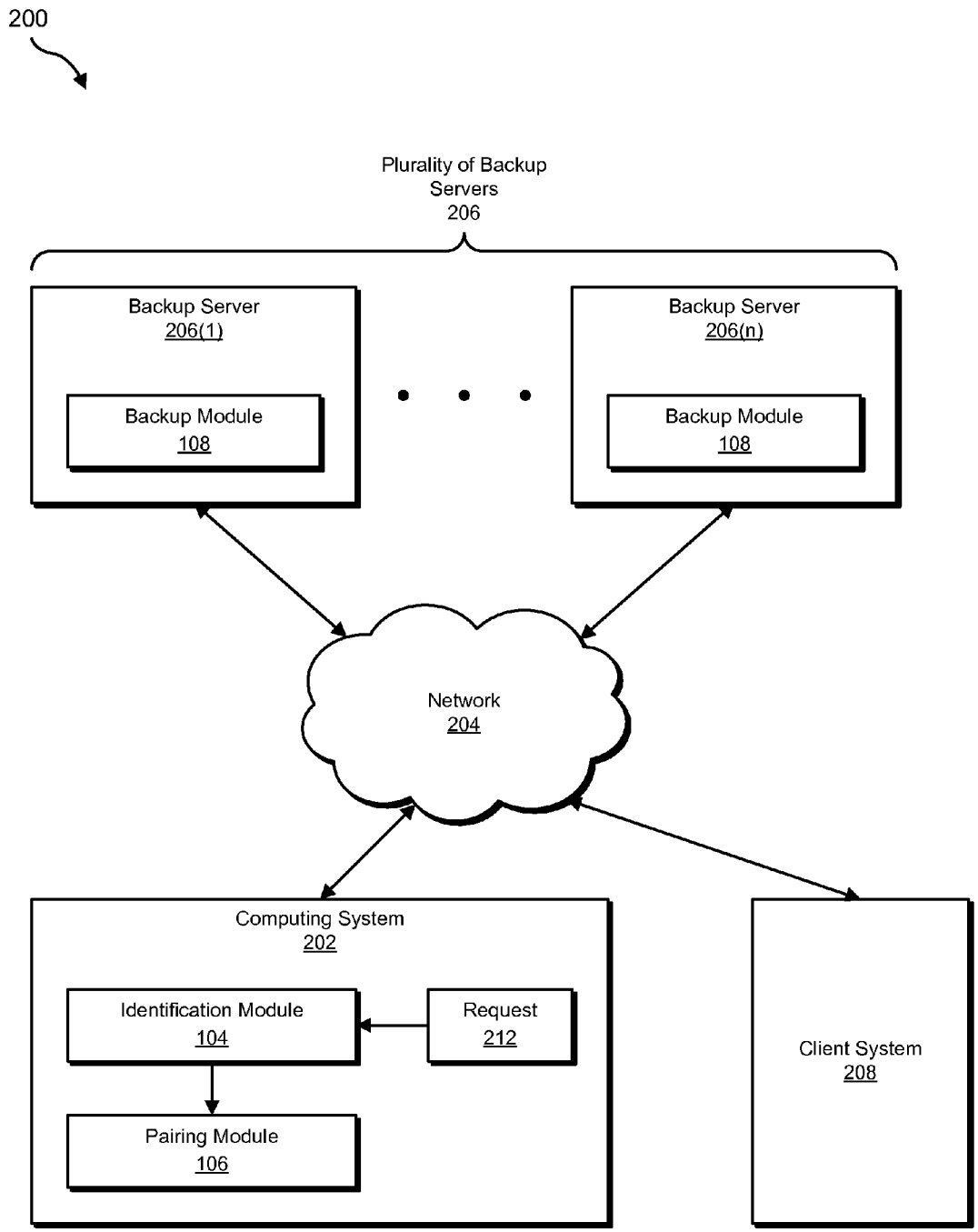
FIG. 2 is a block diagram of another exemplary system for performing backups.
Figure 3:
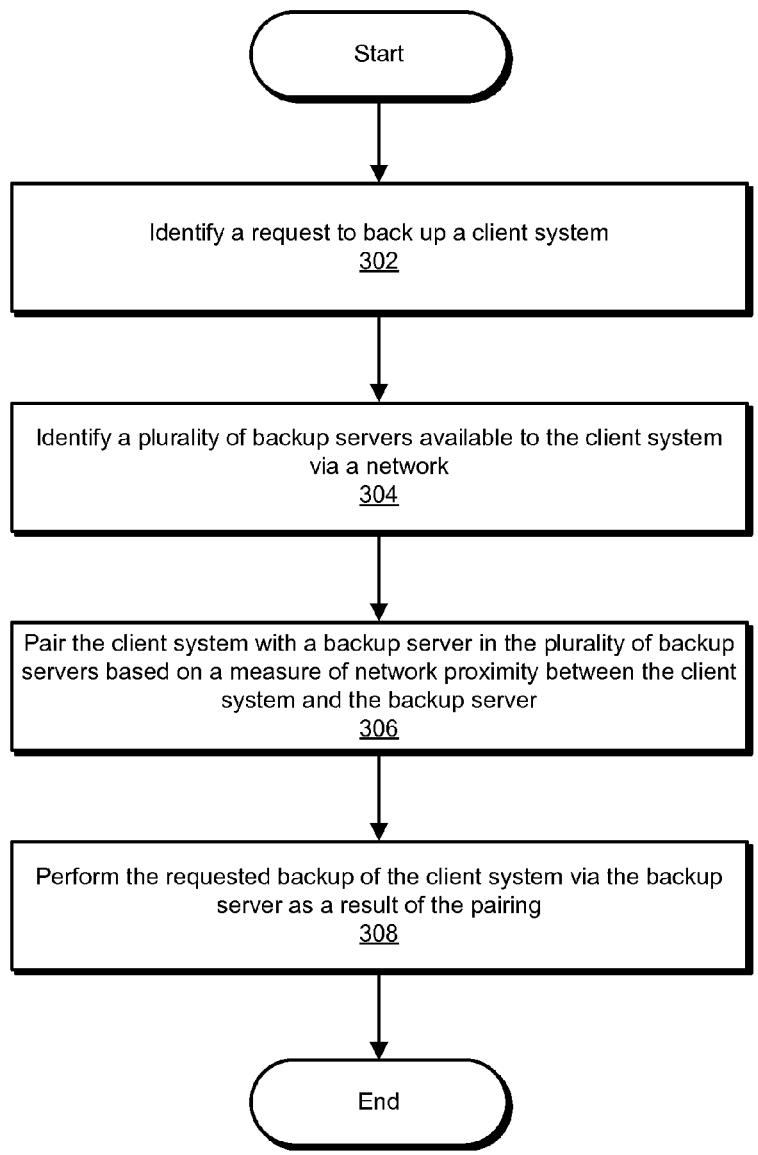
FIG. 3 is a flow diagram of an exemplary method for performing backups.
Figure 4:
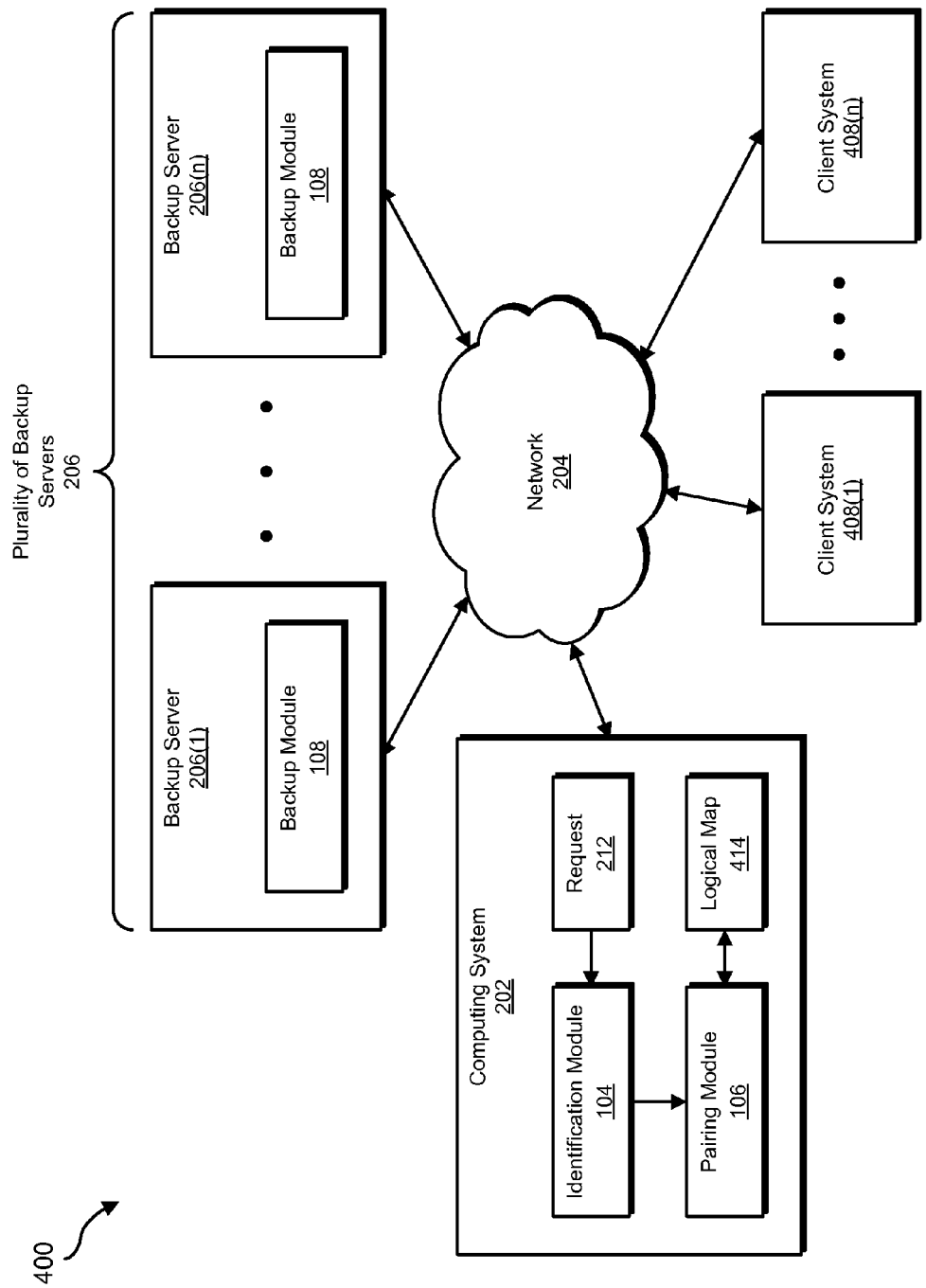
FIG. 4 is a block diagram of an exemplary system for performing backups.

The following will provide, with reference to FIGS. 1, 2, and 4, detailed descriptions of exemplary systems for performing backups. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for performing backups. As illustrated in this figure, exemplary system 100 may include one or more modules 102 for performing one or more tasks. For example, and as will be explained in greater detail below, exemplary system 100 may include an identification module 104 programmed to identify a request to back up a client system and to identify a plurality of backup servers available to the client system via a network. Exemplary system 100 may also include a pairing module 106 programmed to pair the client system with a backup server in the plurality of backup servers based on a measure of network proximity between the client system and the backup server.

In addition, and as will be described in greater detail below, exemplary system 100 may include a backup module 108 programmed to perform the requested backup of the client system via the backup server as a result of the pairing. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or backup servers 206(1)-(n)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with a plurality of backup servers 206 and a client system 208 via a network 204. In one embodiment, and as will be described in greater detail below, computing system 202 may include identification module 104 and pairing module 106 and one or more of backup servers 206(1)-(n) may include backup module 108.

Identification module 104 may be programmed to identify request 212 to back up client system 208. Identification module 104 may also be programmed to identify plurality of backup servers 206 available to client system 208 via network 204. Pairing module 106 may be programmed to pair client system 208 with a backup server (e.g., backup server 206(1)) in plurality of backup servers 206 based on a measure of network proximity between client system 208 and backup server 206(1). Backup module 108 may be programmed to perform the requested backup of client system 208 via backup server 206(1) as a result of the pairing.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Backup servers 206(1)-(n) generally represent any type or form of computing device that is capable of performing and/or facilitating a backup operation, a restoration operation, an archival operation and/or any similar operation. Examples of backup servers 206(1)-(n) include, without limitation, backup servers and/or application servers configured to run certain software applications.

Client system 208 generally represents any type or form of computing device capable of reading computer-executable instructions and/or any storage system connected to and/or utilized by such a device. Examples of client system 208 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), a storage area network (SAN), the Internet, power line communications (PLC), a cellular network (e.g., a GSM Network), exemplary network architecture 600 in FIG. 6, some combination thereof (e.g., multiple interconnected networks), or the like. Network 204 may facilitate communication or data transfer using wireless or wired connections. In one embodiment, network 204 may facilitate communication between computing system 202, backup servers 206(1)-(n), and client system 208.

FIG. 3 is a flow diagram of an exemplary computer-implemented method 300 for performing backups. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a request to back up a client system. For example, at step 302 identification module 104 may, as part of computing system 202 in FIG. 2, identify request 212 to back up client system 208.

As used herein, the phrase "request to back up a client system" may refer to any request, instruction, and/or configuration directed to performing one or more backup operations (or similar operations, such as restoration operations, archival operations, etc.) of the client system. The backup operation may include a full backup (e.g., of a volume, storage device, etc.) or a partial backup (e.g., a targeted backup, an incremental backup, etc.). The backup operation may include a one-time backup and/or a series of backups.

Identification module 104 may perform step 302 in any suitable manner. For example, identification module 104 may receive a communication (e.g., from the client system, a backup manager, etc.) requesting the backup. Additionally or alternatively, identification module 104 may read a configuration file identifying a request and/or an instruction to perform a backup.

At step 304 one or more of the systems described herein may identify a plurality of backup servers available to the client system via a network. For example, at step 304 identification module 104 may, as part of computing system 202 in FIG. 2, identify plurality of backup servers 206 available to client system 208 via network 204.

Identification module 104 may perform step 304 in any suitable manner. For example, identification module 104 may identify the plurality of backup servers by reading a configuration file identifying the plurality of backup servers. Additionally or alternatively, identification module 104 may identify the plurality of backup servers by receiving a communication from an application identifying the plurality of backup servers. In some examples, identification module 104 may identify the plurality of backup servers by scanning the network for the plurality of backup servers.

At step 306 one or more of the systems described herein may pair the client system with a backup server in the plurality of backup servers based on a measure of network proximity between the client system and the backup server. For example, at step 306 pairing module 106 may, as part of computing system 202 in FIG. 2, pair client system 208 with a backup server in plurality of backup servers 206 (e.g., backup server 206(1)) based on a measure of network proximity between client system 208 and backup server 206(1). As used herein, the phrase "measure of network proximity" may refer to any measure, assessment, and/or decision regarding any efficiencies and/or efficacies resulting in a pairing of two members of a network. As used herein, the term "pairing" may refer to any suitable method of assignment of a network resource to a network client.

Pairing module 106 may perform step 306 in a variety of ways. For example, pairing module 106 may pair the client system with the backup server by first creating a logical map of the network. As used herein, the phrase "logical map" may refer to any abstraction of the network useful for identifying optimal and/or efficient pairings between clients and backup servers, including but not limited to network topology, network addresses, network metrics, etc. As an example, FIG. 4 is a block diagram illustrating an exemplary computing system 400. As illustrated in FIG. 4, pairing module 106 may create a logical map 414 of network 204 (e.g., including network addresses of client systems 408(1)-(n) and backup servers 206(1)-(n)).

In some examples, pairing module 106 may scan and/or analyze the network to generate and/or gather data and then generate the logical map. For example, pairing module 106 may scan the network for all members (e.g., clients and servers) and store their addresses and/or locations. In some examples, pairing module 106 may receive, retrieve, or otherwise read results of scans and/or analyses by separate applications and/or systems and then generate the logical map. For example, pairing module 106 may receive information from agents operating on each member of the network. In certain examples, pairing module 106 may receive, retrieve, or otherwise read the logical map as generated by a separate application or system. In these examples, pairing module 106 may create the logical map simply by creating a copy of the logical map (e.g., by loading the logical map into memory). For example, pairing module 106 may communicate with an application implementing the Open Shortest Path First (OSPF) protocol, an application implementing the Application Layer Traffic Optimization (ALTO) protocol, CISCO MEDIANET technology, etc. In some examples, pairing module 106 may save a copy of the logical map for future use.

After creating the logical map of the network, pairing module 106 may determine that the backup server has a higher measure of network proximity to the client system than at least one alternative backup server in the plurality of backup servers. Pairing module 106 may determine that the backup server has a higher measure of network proximity in a variety of ways. For example, pairing module 106 may assign network proximity scores for potential client/server pairs. In this example, a higher score may equate to a higher measure of network proximity. Additionally or alternatively, pairing module 106 may apply a heuristic procedure to select the backup server for the pairing. In this example, the potential client/server pairs need not have assigned proximity scores; simply by applying the heuristic procedure and selecting the backup server, pairing module 106 may determine that the backup server has a higher measure of network proximity than the alternative backup server.

In some examples, pairing module 106 may generate a list of backup servers for potential pairings. For example, pairing module 106 may evaluate a network address of the client system against the logical map to determine the most proximate backup servers. Pairing module 106 may then select the backup server from the list of backup servers for pairing (e.g., maintaining the remainder of the list as alternatives in case the pairing fails). Additionally or alternatively, pairing module 106 may select multiple backup servers from the list of backup servers (e.g., after determining that the client system requires or would perform better using multiple backup servers).

As mentioned earlier, the measure of network proximity may include one or more of a variety of measurements and/or other data. For example, the measure of network proximity may include a measure of network cable distance between the client system and the backup server (e.g., as manually identified by a user, as automatically estimated, etc.). As another example, the measure of network proximity may include a number of network hops between the client system and the backup server (e.g., the number of intermediate devices, such as routers, on the network between the client system and the backup server). Additionally or alternatively, the measure of network proximity may include a number of switches between the client system and the backup server (e.g., the number of multi-layer switches). The measure of network proximity may also include a number of bridges between the client system and the backup server (e.g., the number of layer 2 switches). As an additional example, the measure of network proximity may include a measure of time taken for a packet to travel between the client system and the backup server. For example, the measure of network proximity may include a result of a ping operation. In another example, the measure of network proximity may include a network address difference between the client system and the backup server. For example, the measure of network proximity may include an indication of whether the client system and the backup server are in the same sub-network according to a predetermined addressing scheme.

In some examples, pairing module 106 may use a variety of additional information to enhance measurements of network proximity and/or enhance the use of the measure of network proximity in pairing. For example, pairing module 106 may pair the client system to the backup server based on traits of the network. In one example, pairing module 106 may pair the client system to the backup server based on the network bandwidth available between the client system and the backup server. For example, pairing module 106 may measure (or identify a measurement of) the network bandwidth available on one or more routes from the client system to the backup server. In another example, pairing module 106 may pair the client system to the backup server based on the potential throughput from the client system to the backup server. Generally, pairing module 106 may use any indicator of the network performance between the client system and the backup server (e.g., measurements of connection reliability), and/or any other network traits that may affect communication between the client system and the backup server (e.g., network channel security classifications).

In some examples, pairing module 106 may coordinate the use of resources by the client system and other client systems with the plurality of backup systems. For example, pairing module 106 may pair the client system with the backup system based on an immediate backup need of the client system and/or an immediate backup capacity of the backup server. In this example, pairing module 106 may determine that the backup server has an immediate capacity sufficient to fulfill the client system's immediate need. In another example, pairing module 106 may pair the client system with the backup system based on a scheduled need of the client system and/or a projected capacity of the backup server. In this example, pairing module 106 may determine that the backup server has a projected capacity sufficient to fulfill the client system's scheduled need. For example, pairing module 106 may identify a schedule for the backup server (e.g., by aggregating the backup schedules of clients already paired to the backup server). Pairing module 106 may then compare the schedule for the backup server with the backup schedule of the client system to determine that the backup schedule of the client system will fit into an availability in the schedule for the backup server (e.g., that after pairing the client system with the backup server that the backup server, the underlying backup storage, and/or the network would not be overloaded).

In some examples, pairing module 106 may consider multiple backup servers at a time and/or multiple client systems at a time to ensure to each client system is suitably paired (e.g., to prevent all backup servers proximate to a client system from being allocated for a time when the client system requires a proximate backup server). Pairing module 106 may consider a variety of factors in assessing backup server capacity, including but not limited to interface bandwidth, storage unit type, media type, etc.).

In some examples, pairing module 106 may enforce a network proximity threshold. For example, pairing module 106 may pair the client system with the backup server only after determining that the measure of network proximity between the client system and the backup server meets a predetermined threshold. This may be useful if no suitable backup server is currently available (e.g., due to maintenance). Rather than pairing the client system with an inefficient backup server (e.g., across a WAN over a slow link), pairing module 106 may pause the backup of the client system and/or return an error.

In some examples, pairing module 106 may use a variety of additional criteria during the pairing. For example, pairing module 106 may pair the client system with the backup server to load-balance portions of the network. In this example, pairing module 106 may pair the client system with the backup server such that the network traffic created by scheduled backups is unlikely to interfere with other applications requiring network resources and that the scheduled backups will have sufficient network resources to successfully execute. In another example, pairing module 106 may pair the client system with the backup server to load-balance the plurality of backup servers. In this example, pairing module 106 may pair the client system with the backup server such that the resources of other backup servers in the plurality of backup servers are not overburdened and that the backup of the client system may have sufficient resources to execute.

In some examples, pairing module 106 may pair the client system to the backup server after identifying a fail-over from a potential pairing of the client system to an alternative backup server in the plurality of backup servers. For example, as discussed earlier pairing module 106 may identify and keep a list of multiple backup servers for potential pairings with the client system. Pairing module 106 may accordingly select the alternative backup server from the list first, only to subsequently identify a need for a fail-over from the alternative backup server (e.g., due to equipment failure). Pairing module 106 may then refer to the list of backup servers and select the backup server for pairing with the client system.

Similarly, pairing module 106 may pair the client system to the backup server after determining that an alternative backup server is busy. For example, the client system may initially be paired with the alternative backup server. At the time of backup, due to error or other unforeseen circumstance, the alternative backup server may be busy performing a backup for a different client system. Accordingly, pairing module 106 may pair the client system to the backup server.

In some examples, pairing module 106 may determine that the backup server is proximate to the client system but that the backup server is currently unavailable for backup services. Accordingly, pairing module 106 may pair the client system with no backup server. Pairing module 106 may subsequently determine that the backup server is available (e.g., by periodically querying the backup server, by transmitting an availability notification request to the backup server, etc.). Pairing module 106 may then pair the client system with the backup server.

Pairing module 106 may operate in a variety of contexts. For example, pairing module 106 may request backup resources from a media manager. As used herein, the phrase "media manager" may refer to any system and/or apparatus for allocating backup server resources. The media manager may then transmit the pairing in response to the request. Additionally or alternatively, pairing module 106 may include portions of the media manager.

Returning to FIG. 3, at step 308 one or more of the systems described herein may perform the requested backup of the client system via the backup server as a result of the pairing. For example, at step 308 backup module 108 may, as part of backup server 206(1) in FIG. 2, perform the requested backup of client system 208 as a result of the pairing.

Backup module 108 may perform step 308 in any suitable manner. For example, backup module 108 may perform the requested backup by retrieving backup data from the client system over the network. In another example, backup module 108 may include portions of the client system. In this example, backup module 108 may perform the requested backup by transmitting backup data over the network to the backup server. After step 308, method 300 may terminate.

By analyzing backup needs and resources in the context of network topology, systems and methods described herein may efficiently use and/or allocate resources (e.g., network bandwidth, server capacity, etc.), minimize interference with primary applications, and/or increase backup performance and reliability. By automatically pairing clients with backup servers, these systems and methods may also save time for administrators who may otherwise have manually configured target backup servers for each client.

As an example of how the systems and methods described herein may operate, these systems and methods may be implemented to operate in conjunction with and/or as a part of an existing backup system (e.g., SYMANTEC NETBACKUP). For example, the backup system may employ SYMANTEC NETBACKUP DOMAIN NETWORK ANALYZER, the BPTESTNETCONN utility, the VNETD utility, SYMANTEC NETBACKUP REMOTE MANAGER AND MONITOR SERVICE, and/or any suitable third-party tool to discover the network map of all configured hostnames within the domain of the backup system. The network domain map may then be stored within a database. The client system may be configured to use a special built-in storage unit. When a scheduled backup is due to run, if the backup policy is configured to use the special built-in storage unit, a request broker may negotiate the resources an application that manages the database for a selection of a storage unit. The application may then use the network proximity map to evaluate the network proximity between the client and each server. The application may also take into account the load on the servers. The application may then allocate and reserve resources for the storage unit and provide the information for performing the backup.

Figure 5:
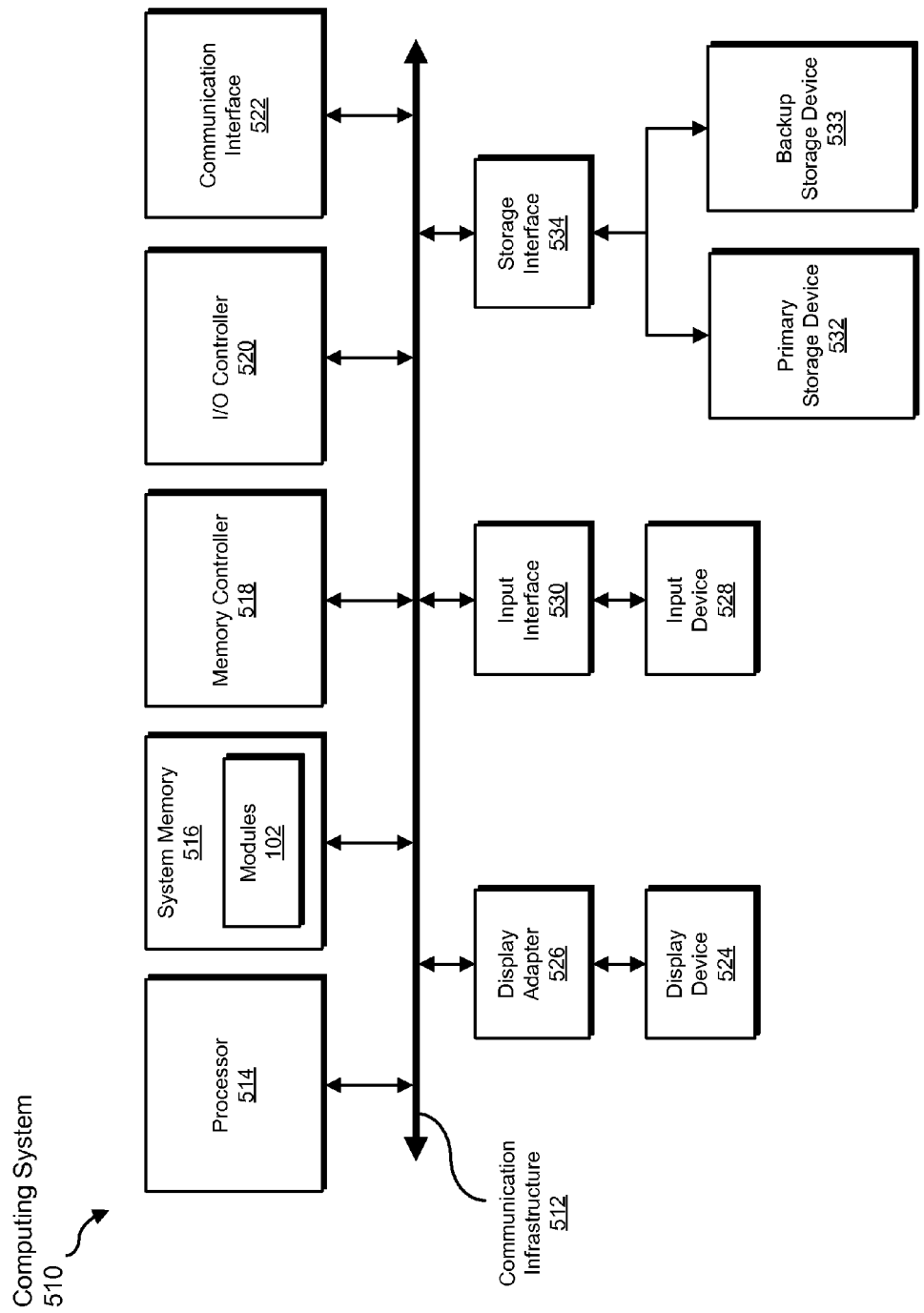
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, pairing, creating, determining, communicating, receiving, and/or performing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, pairing, creating, determining, communicating, receiving, and/or performing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, pairing, creating, determining, communicating, receiving, and/or performing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, pairing, creating, determining, communicating, receiving, and/or performing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, pairing, creating, determining, communicating, receiving, and/or performing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, pairing, creating, determining, communicating, receiving, and/or performing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
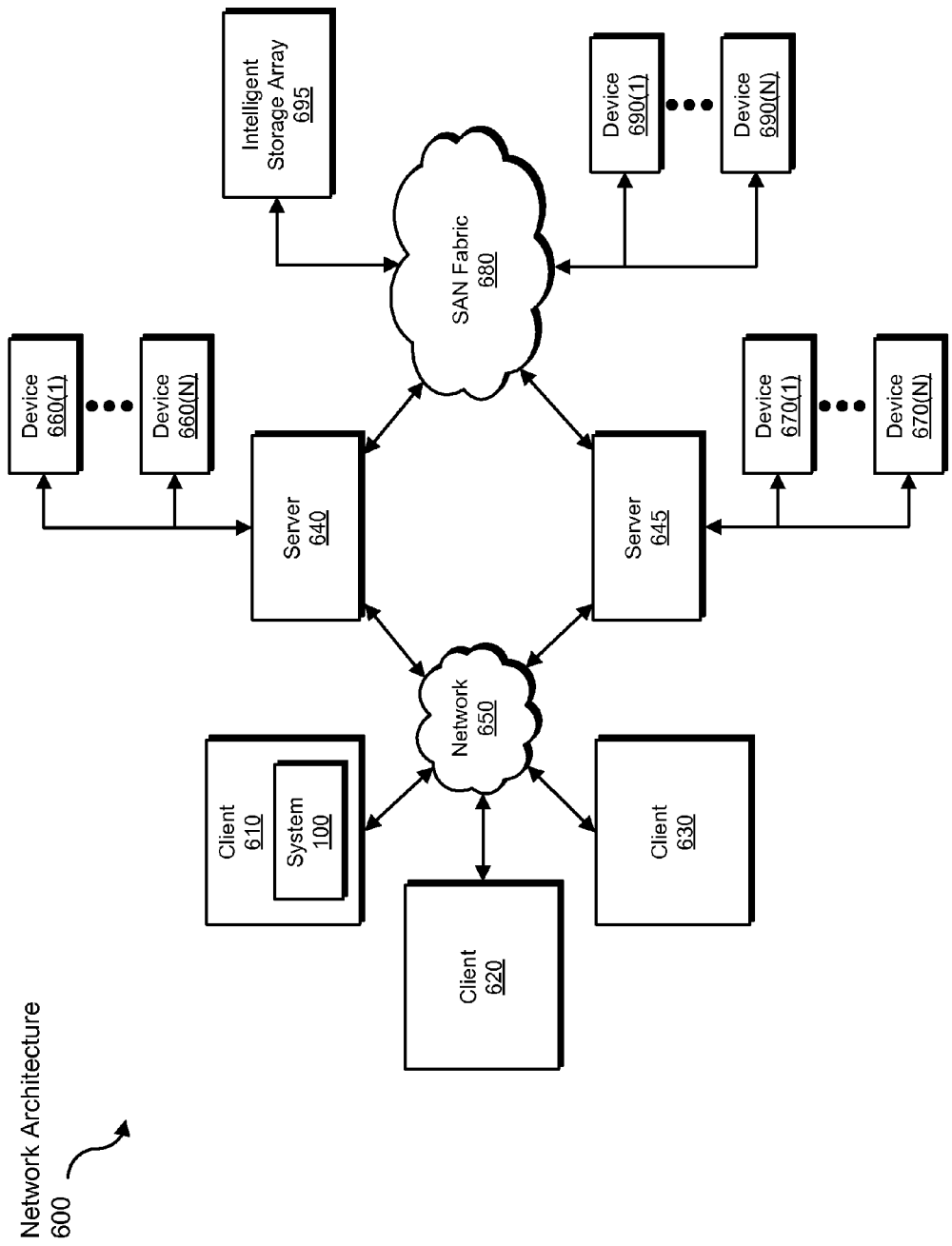
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, pairing, creating, determining, communicating, receiving, and/or performing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for performing backups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a backup system into a backup system for efficiently pairing clients to backup servers.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing backups, at least a portion of the method being performed by a computing device comprising at least one processor, the method comprising:
   identifying a request to back up a client system within a plurality of client systems within a network;
   identifying a plurality of backup servers available to the client system via the network;
   identifying at least two backup servers within the plurality of backup servers that have projected backup-storage capacities sufficient to fulfill a scheduled backup-storage need of the client system by, for each of the two backup servers:
      identifying a backup schedule of the backup server by identifying a backup schedule of one or more of the plurality of client systems already paired with the backup server;
      comparing the backup schedule of the backup server with a backup schedule of the client system;
      determining, based at least in part on comparing the backup schedule of the backup server with the backup schedule of the client system, that the backup schedule of the client system will fit into an availability in the backup schedule of the backup server;
   creating a logical map of the network, the logical map of the network identifying:
      each client system within the plurality of client systems;
      each backup server within the plurality of backup servers;
      configuration details of the network for use in pairing one or more of the plurality of client systems with one or more of the plurality of backup servers based at least in part on network proximity;
   pairing the client system with at least one of the two backup servers based on a measure of network proximity between the client system and the two backup servers, wherein the measure of network proximity between the client system and the two backup servers is based at least in part on the logical map of the network;
   performing the requested backup of the client system via the paired backup server as a result of the pairing.

2. The computer-implemented method of claim 1, wherein pairing the client system with one of the two backup servers based on the measure of network proximity comprises determining, based at least in part on the logical map of the network, that one of the two backup servers has a higher measure of network proximity to the client system than the other one of the two backup servers.

3. The computer-implemented method of claim 1, wherein the measure of network proximity comprises at least one of:
   a measure of network cable distance between the client system and one of the two backup servers;
   a number of network hops between the client system and one of the two backup servers;
   a number of switches between the client system and one of the two backup servers;
   a number of bridges between the client system and one of the two backup servers;
   a measure of time taken for a packet to travel between the client system and one of the two backup servers;
   a network address difference between the client system and one of the two backup servers.

4. The computer-implemented method of claim 1, wherein pairing the client system with one of the two backup servers based on the measure of network proximity comprises pairing the client system with one of the two backup servers based on at least one of:
   network bandwidth available between the client system and one of the two backup servers;
   potential throughput from the client system to one of the two backup servers;
   network performance between the client system and one of the two backup servers;
   network traits affecting communication between the client system and one of the two backup servers.

5. The computer-implemented method of claim 1, wherein pairing the client system with one of the two backup servers based on the measure of network proximity comprises pairing the client system with one of the two backup servers based on at least one of:
   an immediate backup need of the client system;
   at least one scheduled backup need of the client system;
   an immediate backup capacity of one of the two backup servers;
   at least one projected backup capacity of one of the two backup servers.

6. The computer-implemented method of claim 1, wherein pairing the client system with one of the two backup servers based on the measure of network proximity comprises determining that the measure of network proximity meets a predetermined threshold.

7. The computer-implemented method of claim 1, wherein pairing the client system with one of the two backup servers based on the measure of network proximity further comprises pairing the client system with one of the two backup servers to load-balance at least one of:
   a plurality of portions of the network;
   the plurality of backup servers.

8. The computer-implemented method of claim 1, wherein pairing the client system with one of the two backup servers based on the measure of network proximity comprises pairing the client system with one of the two backup servers after at least one of:
   identifying a fail-over from a potential pairing of the client system to an alternative backup server in the plurality of backup servers;
   identifying a busy state after attempting a backup to the alternative backup server.

9. The computer-implemented method of claim 1, wherein pairing the client system with one of the two backup servers based on the measure of network proximity further comprises:
   determining that not one of the two backup servers is available for backup services;
   pairing the client system with no backup server;
   subsequently determining that one of the two backup servers is available;
   pairing the client system with one of the two backup servers.

10. A system for performing backups, the system comprising:

an identification module programmed to:
  identify a request to back up a client system within a plurality of client systems within a network;
  identify a plurality of backup servers available to the client system via the network;
  identify at least two backup servers within the plurality of backup servers that have projected backup-storage capacities sufficient to fulfill a scheduled backup-storage need of the client system by, for each of the two backup servers:
    identifying a backup schedule of the backup server by identifying a backup schedule of one or more of the plurality of client systems already paired with the backup server;
    comparing the backup schedule of the backup server with a backup schedule of the client system;
    determining, based at least in part on comparing the backup schedule of the backup server with the backup schedule of the client system, that the backup schedule of the client system will fit into an availability in the backup schedule of the backup server;
a pairing module programmed to:
  create a logical map of the network, the logical map of the network identifying:
    each client system within the plurality of client systems;
    each backup server within the plurality of backup servers;
    configuration details of the network for use in pairing one or more of the plurality of client systems with one or more of the plurality of backup servers based at least in part on network proximity;
  pair the client system with at least one of the two backup servers based on a measure of network proximity between the client system and the two backup servers, wherein the measure of network proximity between the client system and the two backup servers is based at least in part on the logical map of the network;
a backup module programmed to perform the requested backup of the client system via the paired backup server as a result of the pairing;
at least one processor configured to execute the identification module, the pairing module, and the backup module.

11. The system of claim 10, wherein the pairing module is programmed to pair the client system with one of the two backup servers based on the measure of network proximity by determining, based at least in part on the logical map of the network, that one of the two backup servers has a higher measure of network proximity to the client system than the other one of the two backup servers.

12. The system of claim 10, wherein the measure of network proximity comprises at least one of:
  a measure of network cable distance between the client system and one of the two backup servers;
  a number of network hops between the client system and one of the two backup servers;
  a number of switches between the client system and one of the two backup servers;
  a number of bridges between the client system and one of the two backup servers;
  a measure of time taken for a packet to travel between the client system and one of the two backup servers;
  a network address difference between the client system and one of the two backup servers.

13. The system of claim 10, wherein the pairing module is programmed to pair the client system with one of the two backup servers based on the measure of network proximity by pairing the client system with one of the two backup servers based on at least one of:
  network bandwidth available between the client system and one of the two backup servers;
  potential throughput from the client system to one of the two backup servers;
  network performance between the client system and one of the two backup servers;
  network traits affecting communication between the client system and one of the two backup servers.

14. The system of claim 10, wherein the pairing module is programmed to pair the client system with one of the two backup servers based on the measure of network proximity by pairing the client system with one of the two backup servers based on at least one of:
  an immediate backup need of the client system;
  at least one scheduled backup need of the client system;
  an immediate backup capacity of one of the two backup servers;
  at least one projected backup capacity of one of the two backup servers.

15. The system of claim 10, wherein the pairing module is programmed to pair the client system with one of the two backup servers based on the measure of network proximity by determining that the measure of network proximity meets a predetermined threshold.

16. The system of claim 10, wherein the pairing module is programmed to pair the client system with one of the two backup servers based on the measure of network proximity by pairing the client system with one of the two backup servers to load-balance at least one of:
  a plurality of portions of the network;
  the plurality of backup servers.

17. The system of claim 10, wherein the pairing module is programmed to pair the client system with one of the two backup servers based on the measure of network proximity by pairing the client system with one of the two backup servers after at least one of:
  identifying a fail-over from a potential pairing of the client system to an alternative backup server in the plurality of backup servers;
  identifying a busy state after attempting a backup to the alternative backup server.

18. A non-transitory computer-readable-storage medium comprising one or more computer-executable instructions that, when executed by at least one processor of a computing device, cause the computing device to:
  identify a request to back up a client system within a plurality of client systems within a network;
  identify a plurality of backup servers available to the client system via the network;
  identify at least two backup servers within the plurality of backup servers that have projected backup-storage capacities sufficient to fulfill a scheduled backup-storage need of the client system by, for each of the two backup servers:
    identifying a backup schedule of the backup server by identifying a backup schedule of one or more of the plurality of client systems already paired with the backup server;
    comparing the backup schedule of the backup server with a backup schedule of the client system;
    determining, based at least in part on comparing the backup schedule of the backup server with the backup schedule of the client system, that the backup schedule of the client system will fit into an availability in the backup schedule of the backup server;

create a logical map of the network, the logical map of the network identifying:

each client system within the plurality of client systems;

each backup server within the plurality of backup servers;

configuration details of the network for use in pairing one or more of the plurality of client systems with one or more of the plurality of backup servers based at least in part on network proximity;

pair the client system with at least one of the two backup servers based on a measure of network proximity between the client system and the two backup servers, wherein the measure of network proximity between the client system and the two backup servers is based at least in part on the logical map of the network;

perform the requested backup of the client system via the paired backup server as a result of the pairing.

* * * * *